(12) United States Patent
Watanuki et al.

(10) Patent No.: US 6,627,094 B2
(45) Date of Patent: Sep. 30, 2003

(54) METHOD OF MANUFACTURING THIN FILM HEAD

(75) Inventors: Motoichi Watanuki, Kawasaki (JP); Hiroyuki Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 36 days.

(21) Appl. No.: 09/726,924

(22) Filed: Nov. 30, 2000

(65) Prior Publication Data

US 2002/0127342 A1 Sep. 12, 2002

(30) Foreign Application Priority Data

Apr. 20, 2000 (JP) ........................................ 2000-119845

(51) Int. Cl.⁷ .............................. B44C 1/22; G11B 5/39
(52) U.S. Cl. ................... 216/22; 29/603.07; 29/603.18; 360/103
(58) Field of Search .......................... 216/22; 360/103; 427/402; 29/603.07, 603.18

(56) References Cited

U.S. PATENT DOCUMENTS 5,738,931 A * 4/1998 Sato et al. .................. 428/209
6,040,958 A * 3/2000 Yamamoto et al. ...... 360/236.3

FOREIGN PATENT DOCUMENTS

| JP | 06-251351 | 9/1994 |
|----|-----------|--------|
| JP | 10-255243 | 9/1998 |

* cited by examiner

Primary Examiner—Benjamin L. Utech
Assistant Examiner—Shamim Ahmed
(74) Attorney, Agent, or Firm—Greer, Burns & Crain Ltd.

(57) ABSTRACT

The method of the present invention is capable of manufacturing a thin film head, which includes a protection layer having enough corrosion-resisting property and water-repellent property, which is capable of keeping the magnetic head clean even if temperature and humidity are high, and which has enough durability and reliability. The method of manufacturing the thin film head, in which a pad, which contacts a disk, and a floating pattern are formed in a disk-side face, comprises the steps of: forming a adhesion layer on the disk-side face of a substrate, which is a main body of the thin film head; forming a protection layer on the adhesion layer; coating the protection layer with resist; patterning the resist so as to form a pad hole at a prescribed position, at which the pad is formed; forming a pad film on resist-coated faces including an inner face of the pad hole; and lifting off the resist so as to form the pad.

6 Claims, 5 Drawing Sheets

METHOD OF MANUFACTURING THIN FILM HEAD

BACKGROUND OF THE INVENTION

The present invention relates to a method of manufacturing a thin film head, more precisely relates to a method of manufacturing a thin film head, which includes a pad capable of preventing the thin film head from sticking onto a recording medium.

In a contact-start-stop (CSS) type magnetic disk drive unit, magnetic heads contact surfaces of magnetic disks while rotation of the disks are stopped; the magnetic heads are floated above the surfaces of the disks by air streams, which are caused by rotation of the disks. Thus, floating patterns are formed in a disk-side face, which faces the surface of the disk, of each magnetic head. Further, pads, which is capable of reducing contact resistance between the disk and the head, are formed in the disk-side face.

The disk-side face of the conventional magnetic head is shown in FIG. 6. The head 10 has the floating patterns 12a, 12b and 12c, shallow groove sections 14a, 14b and 14c and a deep groove section 16. The shallow groove sections 14a, 14b and 14c and the deep groove section 16 act to generate negative pressure when the magnetic head 10 is floated, so that flatting level of the magnetic head 10 can be limited in a prescribed range. In the disk-side face, the floating patterns 12a, 12b and 12c are projected the most other than pads 18a, 18b, 18c and 18d; the floating patterns 12a, 12b and 12c are projected more than the shallow groove sections 14a, 14b and 14c; the deep groove section 16 is deeper than the shallow groove sections 14a, 14b and 14c. The pads 18a, 18b, 18c and 18d are provided in the shallow groove sections 14a, 14b and 14c, and their end faces are projected from surfaces of the floating patterns 12a, 12b and 12c. FIG. 7 shows a state in which the magnetic head 10 is floating above a surface of a rotating disk 20. The magnetic head 10 is held by a suspension 22.

Each time the rotation of the disk is stopped, the pads contact the surface of the magnetic disk. Therefore, the pads must have enough durability because the pads contact the disk many times. To have enough durability, the contact resistance between the pads and the disk must be reduced, and the sticking of the head to the disk and the sticking of dust to the surface of the head must be prevented so as to reduce the contact resistance less than a prescribed value.

A conventional method of forming the pads is shown in FIGS. 5A–5D. Note that, FIGS. 5A–5D are sectional views taken along a line A—A in FIG. 6.

In FIG. 5A, an adhesion layer 32, a protection layer 34, a stopper layer 36 and a pad layer 38 are piled, in this order, on a surface of a substrate 30 of a head slider, which has been finished by lapping machine. The adhesion layer 32 and the stopper layer 36 are silicon film layers; the protection layer 34 and the pad layer 38 are DLC (Diamond Like Carbon) film layers.

In FIG. 5B, the pad layer 38 has been etched, then the stopper layer 36 have been etched so as to form a pad 18. In the etching step, the surface of the pad layer 38 is coated with resist 40, and a resist pattern, which covers over a portion at which the pad 18 is formed, is formed by exposing and developing processes. Then etching is executed.

The pad layer 38 is dry-etched in oxygen gas, then the portion covered with the resist 40 is left and the pad 18 is formed. The stopper layer 36 is selectively etched with CF4 gas. By the etching step, the protection layer 34 other than the portion corresponding to the pad 18 is exposed.

In FIG. 5C, a floating pattern 12 and a shallow groove section 14 are formed. Resist 42 covers over the floating pattern 12 and the pad 18. The protection layer 34, which is the DLC layer, is dry-etched so as to form the floating pattern 12, then the adhesive layer 32 and the substrate 30 are etched by ion milling so as to form the shallow groove section 14. In this step, the surface of the substrate 30 is wholly etched.

In FIG. 5D, a deep groove section 16 is formed in the substrate 30. To etch a portion corresponding the deep groove section 16, the pad 18, the floating pattern 12 and the shallow groove section 14, other than the portion corresponding to the deep groove section 16, are covered with resist 44. The surface of the substrate 30 is etched, by ion milling or dry-etching, so as to form the deep groove section 16 in the surface of the substrate 30.

In the conventional method in which the pad 18 is formed in the disk-side face of the head 10, the stopper layer 36 is formed on the protection layer 34 so as not to etch the lower protection layer 34 when the pad layer 38 is etched.

Silicon invades into the protection layer 34 and a mixing layer is formed in the protection layer 34 when the silicon stopper layer 36 is formed on the protection layer 34. Forming the mixing layer is unavoidable. The silicon in the protection layer 34 cannot be removed by etching and removing the stopper layer 36, and it makes water-repellent property of the protection layer 34 lower. On the other hand, if the stopper layer 36 is etched for a long time so as to perfectly remove the silicon in the protection layer 34, the protection layer 34 is damaged and has a porous structure. In this case, the protection layer 34 is apt to be corroded, and its corrosion-resisting property must be lowered.

SUMMARY OF THE INVENTION

The present invention was invented to solve the problems of the conventional method of forming the pads in the magnetic head.

An object of the present invention is to provide a method of manufacturing a thin film head, which includes a protection layer having enough corrosion-resisting property and water-repellent property, which is capable of keeping the magnetic head clean even if temperature and humidity are high, and which has enough durability and reliability.

To achieve the object, the method of manufacturing the thin film head, in which a pad, which contacts a disk, and a floating pattern are formed in a disk-side face, comprises the steps of: forming a adhesion layer on the disk-side face of a substrate, which is a main body of the thin film head; forming a protection layer on the adhesion layer; coating the protection layer with resist; patterning the resist so as to form a pad hole at a prescribed position, at which the pad is formed; forming a pad film on resist-coated faces including an inner face of the pad hole; and lifting off the resist so as to form the pad.

In the method, a diameter of the pad hole in the resist may be greater than that of the pad, and the pad, which has a prescribed shape, may be formed by etching the pad film after the resist is lifted off. By making the diameter of the pad hole greater than that of the pad, the pad can be precisely formed with predetermined thickness and shape.

In the method, a preferable relationship between a thickness "t" of the resist and a radius difference "L", which is a difference between a radius of the pad hole and that of the pad, is $L \geq 0.5t$.

In the method, the pad film and the protection layer may be coated with another resist after the resist is lifted off, the another resist may be patterned so as to coat prescribed positions, at which the pad and the floating pattern are respectively formed, with the another resist, and the pad film, the protection layer and a surface of the substrate may be etched so as to form the pad and the floating pattern.

In the method, a water-repellent treatment may be executed on the disk-side face after forming the pad and the floating pattern. With this structure, the disk-side face can have higher water-repellent property, so that the disk-side face can be kept clean and the reliability of the head can be improved.

In the method, a base film may be formed as a base layer of the pad film so as to improve abrasion-resisting property of the pad. Hard film, e.g., silicon film, SiC film, is properly employed as the base film.

In the method of the present invention, the corrosion-resisting property of the floating pattern, etc., which are formed in the disk-side face of the head, and the water-repellent property of the surface of the head can be improved, so that the thin film head having high durability and reliability can be manufactured.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 6:
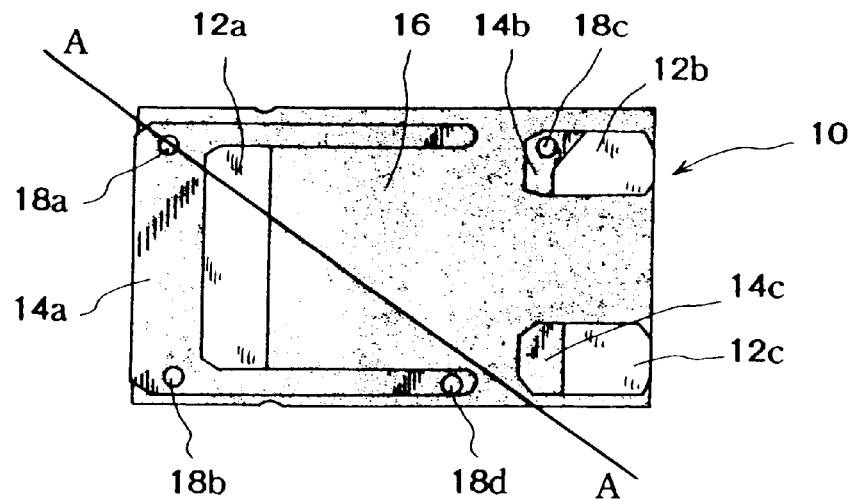
FIG. 6 is a bottom view of the conventional thin film head, in which the disk-side face is shown.
Figure 7:
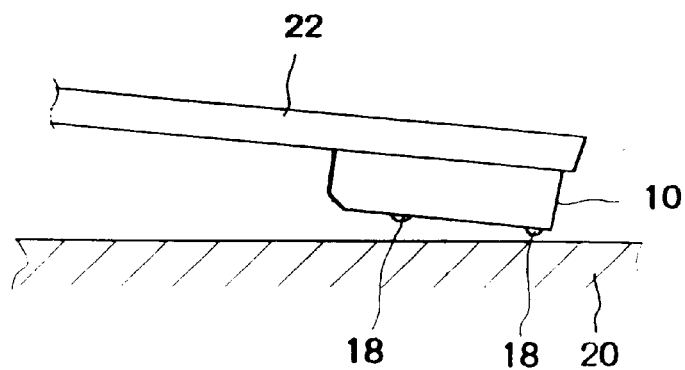
FIG. 7 is an explanation view showing the state in which the conventional thin film head is floated above the surface of the magnetic disk.

FIGS. 1A–1D are explanation views showing the steps of an embodiment of the present invention. Note that, a structure of the thin film head manufactured by the present embodiment is equal to that of the conventional magnetic head shown in FIG. 6. And, FIGS. 1A–1D also correspond to the sectional view taken along the line A—A shown in FIG. 6.

Figure 1A:
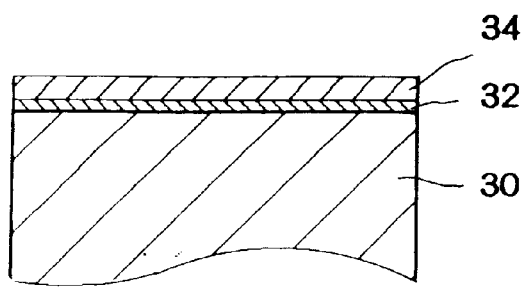
FIGS. 1A–1D are explanation views showing the steps of the method of the present invention.

In FIG. 1A, a silicon adhesion layer 32 and a DLC protection layer 34 are formed on a surface of a substrate 30 of a head slider, which has been finished by lapping machine. In the present embodiment, a thickness of the adhesion layer 32 is 10–30 angstrom; a thickness of the protection layer 34 is 10–50 angstrom. The adhesion layer 32 and the protection layer 34 are formed by conventional film forming machine.

Figure 1B:
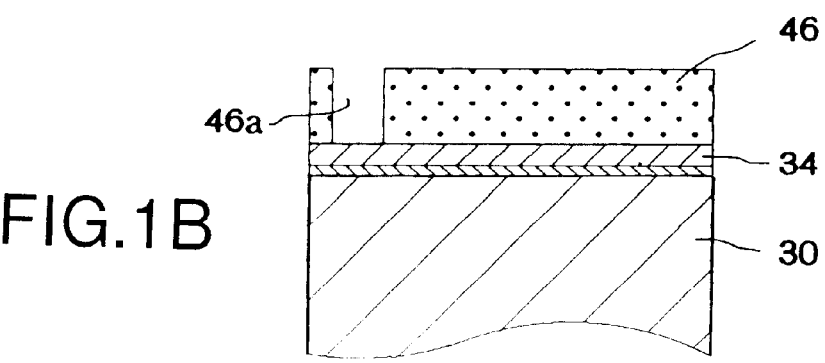

In the method of the present embodiment, pads are formed by a lift-off manner. Therefore, as shown in FIG. 1B, a surface of the protection layer 34 is coated with resist 46 and a pad hole 46a is formed at a prescribed position, at which the pad will be formed, after the protection layer 34 is formed. The pad hole 46a is bored in the resist 46 by exposing and developing processes, and the protection layer 34 is exposed as a bottom face of the pad hole 46a.

Note that, in the present embodiment, size of the pad hole 46a is greater than size of the pad to be formed therein. The reason is that it is difficult to form a pad layer, etc. in the small pad hole 46a with uniform thickness, so the size of the pad hole 46a is made greater so as to form the pad layer as precise as possible.

In the present embodiment, a thickness of the resist 46 is 5–20 μm; a diameter of the pad hole 46a is 40–100 μm.

Figure 1C:
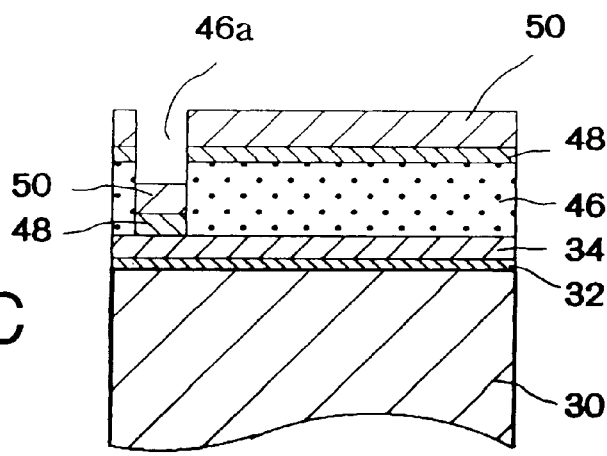

In FIG. 1C, a base film 48 and a pad film 50 are formed in this order after the pad hole 46a is formed in the resist 46. The base film 48 and the pad film 50 are piled on an outer surface of the resist 46, and the base film 48 and the pad film 50 are simultaneously piled in the pad hole 46a. In the present embodiment, the base film is silicon film; the pad film 50 is DLC film. In the present embodiment, a thickness of the base film 48 is 30–100 angstrom; a thickness of the pad film 50 is 300–500 angstrom.

Figure 4A:
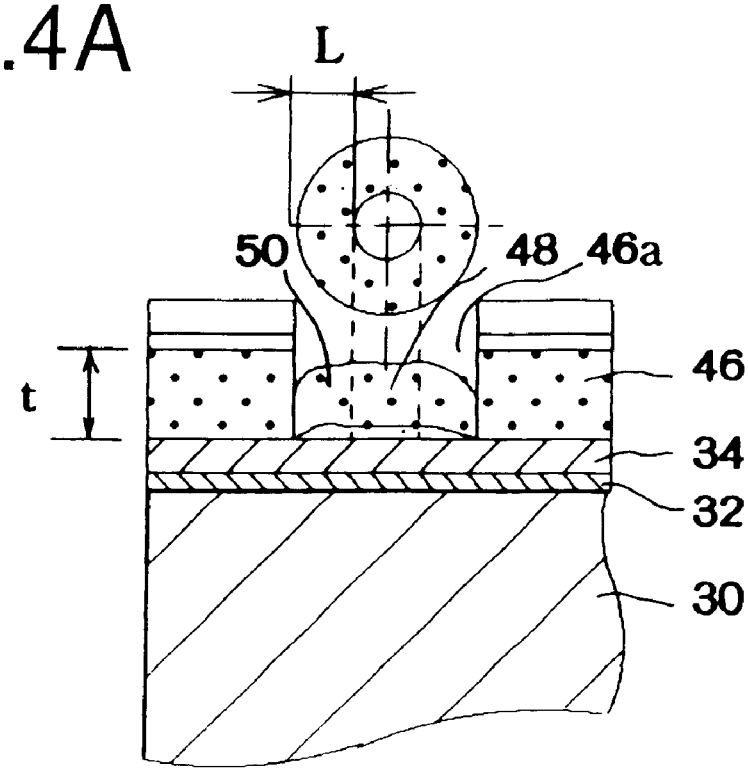
FIG. 4A is a sectional view of a pad hole in which a base layer and a pad layer are formed.

FIG. 4A is an enlarged view showing the base film 48 and the pad film 50, which have been formed and piled in the pad hole 46a. In the pad hole 46a, thickness of center parts of the base film 48 and the pad film 50 are thicker than other parts. Since the base film 48 and the pad film 50, which are formed by spattering, are apt to be lower along an inner edge of the pad hole 46a due to the thickness of the resist 46, the films 48 and 50 cannot be uniformly formed in the pad hole 46a. In the present embodiment, the diameter of the pad hole 46a is relatively great, so that the center parts of the films can have a prescribed thickness in the pad hole 46a.

A proper size of the pad hole 46a may be designed under the following condition: a relationship between a thickness "t" of the resist 46 and a radius difference "L", which is a difference between a radius of the pad hole 46a and that of the pad to be formed, is $L \leq 0.5t$. Under the condition, the pad can be highly precisely formed.

Figure 1D:
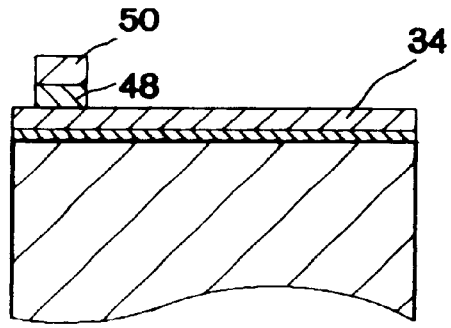

In FIG. 1D, the resist 46 is removed by etching after the base film 48 and the pad film 50 are formed. By removing the resist 46, the base film 48 and the pad film 50, which stick on the surface of the resist 46, are removed together with the resist 46, so that the base film 48 and the pad film 50, which are formed in the pad hole 46a, are left on the protection layer 34.

Figure 2A:
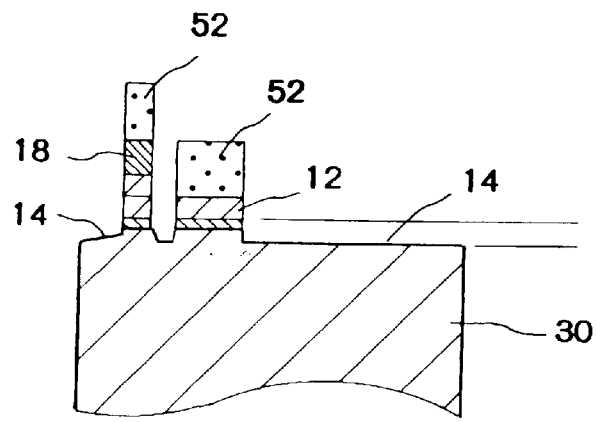
FIGS. 2A and 2B are explanation views showing the steps of forming a pad and a floating pattern.

FIG. 2A is an explanation view showing the step of forming a pad 18, a floating pattern 12 and shallow groove sections 14. To form the pad 18 and the floating pattern 12 with prescribed shapes, the pad film 50 and the protection layer 34 are wholly coated with resist 52, and the resist 52 is patterned by exposing and developing processes so as to cover predetermined portions, in which the pad 18 and the floating pattern 12 will be formed.

The exposed pad film 50, base film 48 and protection layer 34 are etched by dry etching or ion milling, so that the pad 18 and the floating pattern 12 are formed. Further, the substrate 30 is also etched to form the shallow groove sections 14.

Figure 4B:
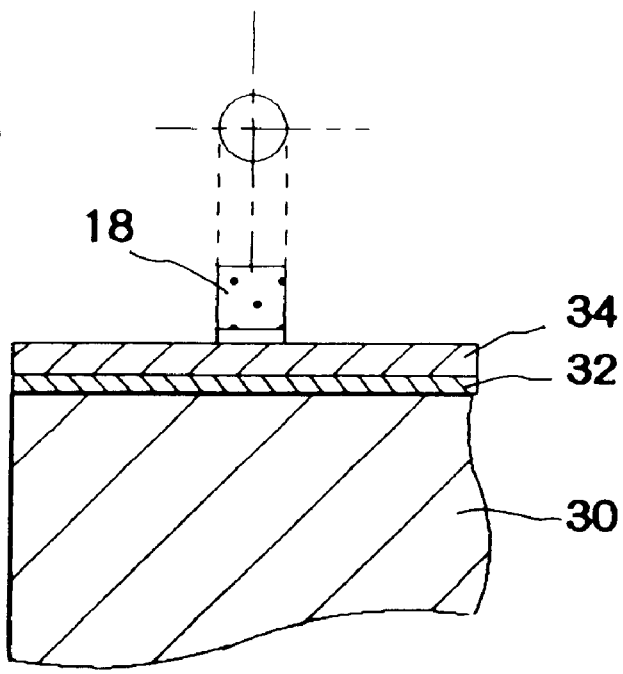
FIG. 4B is a sectional view of a pad formed by etching the base layer and the pad layer.
Figure 5A:
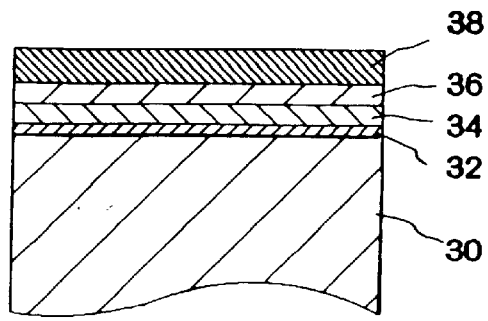
FIGS. 5A–5D are explanation views showing the steps of the conventional method of manufacturing the thin film head.
Figure 5B:
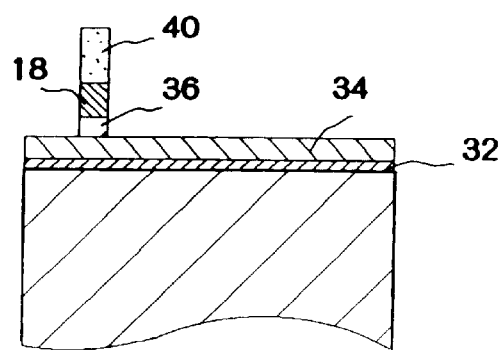
Figure 5C:
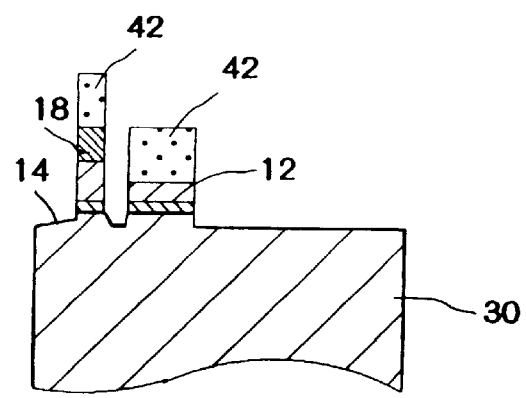
Figure 5D:
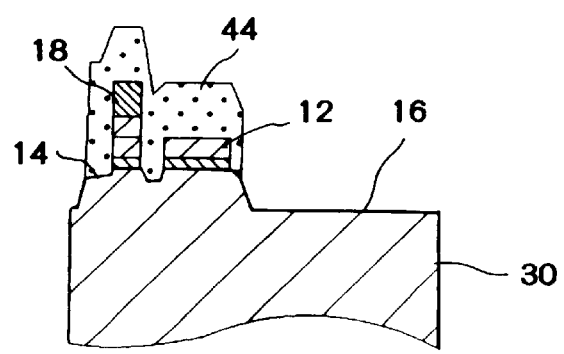

FIG. 4B shows a state in which the pad 18, which has a prescribed shape, is formed by etching the base film 48 and the pad film 50, which are formed in the pad hole 46a. Since the center parts of the base film 48 and the pad film 50 in the pad hole 46a are left, the pad 18, which has the prescribed shape and thickness, can be formed.

In the present embodiment, a diameter of the pad 18 is 30–80 μm; depth of the shallow groove sections 14 are 0.1–0.3 μm.

In the present embodiment, patterning of the pad 18 and the floating pattern 12 and forming the shallow groove sections 14 can be executed by using the resist 52, which covers the pad 18 and the floating pattern 12.

Figure 2B:
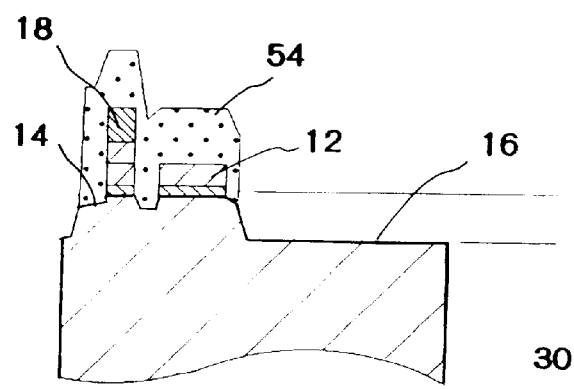

FIG. 2B shows the step of a deep groove section 16. The surface of the substrate 30 is newly coated with resist 54, and the resist 54 is patterned by exposing and developing processes so as to expose a portion, in which the deep groove section 16 is formed. Then, the deep groove section 16 is formed by ion milling. In the present embodiment, a depth of the deep groove section 16 is 1.5–3.0 μm.

With the above described steps, the thin film head including the floating patterns 12, the shallow groove sections 14, the deep groove section 16 and the pads 18, which are formed into prescribed patterns and shapes, can be manufactured.

Figure 3:
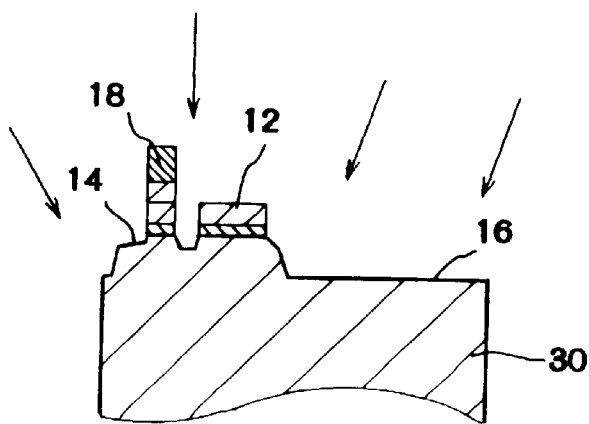
FIG. 3 is an explanation view showing the steps of a water repellent treatment.

FIG. 3 shows the steps of a water repellent treatment. The water repellent treatment is executed so as to keep the surface of the substrate 30 clean. In the present embodiment, the water repellent treatment is executed by dry etching in CF4 gas. The conditions of the dry etching are as follows: CF4 gas 15–25 sccm; gas pressure 50–150 mTorr; RF Power 50–200 W; and etching time 10–50 sec.

In the method of the present embodiment, the pad 18 is made by the lift-off manner, so the protection layer 34 need not be coated with the stopper layer. Therefore, no silicon mixing layer is formed in the protection layer 34. Since no silicon mixing layer is formed in the protection layer 34, the water repellent property of the protection layer 34 and the substrate 30 can be highly improved by executing the water repellent treatment on the disk-side face.

The water repellent property of the floating pattern 12 was compared with that of the floating pattern of the conventional head. In the conventional head, contact angle of pure water was about 60°; in the present embodiment, the contact angle of pure water was about 85°, namely the water repellent property was highly improved. Further, the water repellent property of the surface of the substrate 30 was compared with that of the conventional head. In the conventional head, the contact angle of pure water was about 50°; in the present embodiment, the contact angle of pure water was about 60°.

The floating patterns 12 are formed into the prescribed pattern by etching the protection layer 34, but no mixing layer is formed in the protection layer 34, so the corrosion-resisting property of the floating patterns 12 can be improved. The corrosion-resisting property of the floating pattern 12 was compared with that of the floating pattern of the conventional head. In the present embodiment, the thickness of the protection layer 34 is about 60% of the conventional protection layer, but the corrosion-resisting property of the floating pattern 12 was almost equal to that of the conventional floating pattern.

Since the thickness of the floating patterns 12 can be made thinner, an actual separation between a head element, which is attached to the thin film head, and the surface of the disk can be shorter, so that efficiency of recording and reading data can be improved and storage capacity of a disk drive unit can be highly increased.

In the above described embodiment, the silicon base film 48 are formed as a base layer of the pad film 50 when the pads 18 are formed. The hard base film 48 is formed so as to improve abrasion-resisting property of the pads 18. In another embodiment, SiC film, etc. may be employed as the base film 48.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of manufacturing a thin film head, in which a pad, which contacts a disk, and a floating pattern are formed in a disk-side face, comprising the steps of:

forming a adhesion layer on the disk-side face of a substrate, which is a main body of said thin film head;

forming a protection layer on said adhesion layer;

coating said protection layer with resist;

patterning said resist so as to form a pad hole at a prescribed position, at which said pad is formed;

forming a pad film on resist-coated faces including an inner face of said pad hole; and lifting off said resist so as to form said pad.

2. The method according to claim 1, wherein a diameter of said pad hole in said resist is greater than that of said pad, and said pad, which has a prescribed shape, is formed by etching said pad film after said resist is lifted off.

3. The method according to claim 2, wherein a relationship between a thickness "t" of said resist and a radius difference "L", which is a difference between a radius of said pad hole and that of said pad, is L≧0.5t.

4. The method according to claim 2, wherein said pad film and said protection layer are coated with another resist after said resist is lifted off, said another resist is patterned so as to coat prescribed positions, at which said pad and said floating pattern are respectively formed, with said another resist, and said pad film, said protection layer and a surface of said substrate are etched so as to form said pad and said floating pattern.

5. The method according to claim 1, wherein a water-repellent treatment is executed on said disk-side face after forming said pad and said floating pattern.

6. The method according to claim 1, wherein a base film is formed as a base layer of said pad film so as to improve abrasion-resisting property of said pad.

\* \* \* \* \*